(12) United States Patent
Gretz (10) Patent No.: US 7,025,311 B1
(45) Date of Patent: Apr. 11, 2006

(54) LOW PROFILE SUPPORT FOR OUTDOOR LIGHT FIXTURE

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 542 days.

(21) Appl. No.: 10/307,074

(22) Filed: Nov. 29, 2002

Related U.S. Application Data (63) Continuation-in-part of application No. 10/252,781, filed on Sep. 23, 2002, now Pat. No. 6,742,748, which is a continuation-in-part of application No. 10/112,563, filed on Mar. 28, 2002, now Pat. No. 6,752,362, which is a continuation-in-part of application No. 09/860,064, filed on May 17, 2001, now abandoned.

(51) Int. Cl.
*F16M 3/00* (2006.01)
(52) U.S. Cl. .................. 248/156; 248/530; 248/545; 248/87; 248/75
(58) Field of Classification Search .................. 248/65, 248/49, 74.2, 67.7, 68.1, 72, 156, 530, 87, 248/85, 545; 362/431
See application file for complete search history.

(56) References Cited

U.S. PATENT DOCUMENTS

| 3,257,496 | A | * | 6/1966 | Hamilton | 174/38 |
|---|---|---|---|---|---|
| 3,435,124 | A | * | 3/1969 | Channell | 174/38 |
| 3,585,456 | A | * | 6/1971 | Phillips, Jr. | 317/112 |
| 3,652,779 | A | * | 3/1972 | Grinols | 174/38 |
| 3,831,891 | A | * | 8/1974 | Jester | 248/44 |
| 3,868,474 | A | * | 2/1975 | Bunten | 174/38 |
| 4,076,198 | A | * | 2/1978 | Garrett | 248/49 |
| 4,241,146 | A | * | 12/1980 | Sivachenko et al. | 428/600 |
| 4,334,503 | A | * | 6/1982 | Carey, Jr. | 119/121 |
| 4,519,657 | A | * | 5/1985 | Jensen | 339/15 |
| 4,768,139 | A | | 8/1988 | Poppenheimer | |
| 4,774,648 | A | * | 9/1988 | Kakuk et al. | 362/302 |
| 4,850,565 | A | * | 7/1989 | Moreno | 248/545 |
| 4,858,877 | A | * | 8/1989 | Carter | 248/545 |
| 5,184,279 | A | * | 2/1993 | Horn | 361/356 |
| 5,586,742 | A | * | 12/1996 | Carter | 248/545 |

* cited by examiner

*Primary Examiner*—Ramon O. Ramirez
*Assistant Examiner*—Steven M. Marsh (57) ABSTRACT

A low profile support for mounting and supporting electrical fixtures in an outdoor setting. The apparatus includes an elongated body having side walls and a closed top. The closed top includes an aperture that may be threaded or may include an electrically conductive bushing. Stabilizer bars are provided on the lower portion of the elongated body for anchoring the apparatus to the ground. The stabilizer bars are integral with the body to lower production costs and also to minimize separation of the bars from the body when the support is anchored in the ground. A wide cable entryway is provided in the lower portion to accept electrical feed cables. Cables are pulled into the junction box and the lower portion of the body, including the stabilizer bars, are buried in the ground. An electrical fixture may be mounted to the bushing by simply threading into the top threaded aperture or bushing. After wiring connections are completed within the box, and a cover or faceplate inserted over the electrical device, the apparatus provides a stable, weatherproof enclosure for mounting electrical fixtures in an outdoor setting.

17 Claims, 9 Drawing Sheets

LOW PROFILE SUPPORT FOR OUTDOOR LIGHT FIXTURE

This application is a Continuation-In-Part of U.S. patent application Ser. No. 10/252,781 entitled "Deck Post" filed Sep. 23, 2002 now U.S. Pat. No. 6,742,748 which is a Continuation-In-Part of U.S. patent application Ser. No. 10/112,563 entitled "Outdoor Garden Post" filed Mar. 28, 2002 which is a Continuation-In-Part of U.S. patent application Ser. No. 09/860,064 entitled "Landscape Fixture Support Post", filed May 17, 2001 now abandoned.

FIELD OF THE INVENTION

The present invention relates to the field of outdoor ground-level fixtures and electrical devices, and more particularly to a stable, inexpensive and low profile post for supporting fixtures in a landscape setting outdoors.

BACKGROUND OF THE INVENTION

It is commonly desired by homeowners to improve the nighttime visibility on their property. To accomplish this, homeowners typically add light fixtures to various portions of their property. In order to reduce the installation cost, many homeowners prefer to install their own light fixtures. Although various devices have been proposed for mounting such lights in an outdoor setting, they typically have not been designed to meet the homeowner's needs.

A fixture support post was therefore proposed by the present inventor in U.S. patent application Ser. No. 09/860,064, entitled "Landscape Fixture Support Post", filed May 17, 2001, and incorporated herein by reference in its entirety, in order to provide a simplified fixture support post for the typical homeowner. The fixture support post of Ser. No. 09/860,064 provided a simple design compared to prior art posts. The post, being constructed in one piece, provided a low cost fixture support for the homeowner. Outward projections were provided integral with the post to lower cost and reduce the possibility of separation from the post. The top of the post was designed to accept the most common types of light fixtures by simply threading the base of the fixture into the post. A wide cable entryway was provided on the bottom of the post to allow easy alignment and lead-in of electrical cables into the post. The combination of these elements made it easy for a homeowner to install the support post in the ground and connect a light fixture to the post.

An improved fixture support post was proposed by the present inventor and filed on Mar. 28, 2002 as U.S. patent application Ser. No. 10/112,563, entitled "Outdoor Garden Post", and incorporated herein by reference in its entirety. Prior art outdoor fixture supports typically were designed for mounting a fixture and very specific electrical devices. The outdoor garden post of Ser. No. 10/112,563 provided a post that enabled easy mounting of both a fixture and a standard wall-mounted electrical device. Since the post accepted any standard wall-mounted electrical device, it greatly enhanced the functionality of the post, allowing a homeowner to choose from a wide range of electrical devices without having to purchase a specific post for each. The post provided a junction box integral with the box. This enabled the post to be produced at a low cost and had the advantage of enclosing the wiring connections in a box that met all electrical codes. The outdoor garden post of Ser. No. 10/112,563 therefore provided a device that made it very easy for a homeowner to securely and safely install a fixture in combination with an electrical device, such as a duplex receptacle or a switch, in an outdoor setting. The device essentially enabled electrical fixtures and devices to be mounted outdoors in a manner analogous to the mounting of electrical devices indoors.

U.S. patent application Ser. No. 10/252,781, entitled "Deck Post", filed Sep. 23, 2002 and incorporated herein by reference in its entirety, provided an outdoor fixture and electrical device support for attachment to a deck, or similar structure. The post provided an integral junction box and an arrangement for supporting a light fixture thereon. The post of U.S. Ser. No. 10/252,781 therefore enabled a homeowner to easily secure a fixture and an electrical device to a deck or similar structure. The deck post also enabled electrical fixtures and devices to be mounted outdoors in a manner analogous to the mounting of electrical devices indoors, thereby simplifying the electrical installation for a homeowner.

Although the above summarized inventions provided improved support posts for the homeowner, the device could be further simplified and therefore produced at an even lower cost for those situations in which a homeowner desired only to mount a fixture without an associated electrical device.

The present invention provides a support post for mounting an electrical fixture in an outdoor setting. It can be manufactured at lower cost than the above-mentioned support posts. The entire post can be manufactured in one piece to lower production cost. The post can easily be mounted in the ground and can withstand moisture and ground contact for the life of the installed fixture. Stabilizing devices are provided and are integral with the post to lower cost and greatly reduce the possibility of separation from the post body.

ADVANTAGES OF THE INVENTION

The present invention therefore provides an inexpensive, weatherproof enclosure for mounting fixtures in the ground in an outdoor setting.

The stabilizing bars, being integral with the post, enable a homeowner to firmly secure the low profile support in the ground.

Integrally molding the low profile support of the present invention enables it to be produced at a low cost.

Being integrally molded with collar added enables the low profile support to hide any nicks or cuts caused by errant strikes by lawn mowers and other equipment.

The low profile support of the present invention provides a stable, durable device for mounting electrical fixtures in the ground.

A further advantage is that the low profile support provides a removable cover for accessing and maintaining an outdoor fixture after installation.

It is indeed a further advantage that the low profile support includes a unitary body structure and therefore a minimum of separate parts required for installation.

A further advantage is that the low profile support of the present invention provides a mounting system for outdoor fixtures that is easy and inexpensive to manufacture.

These, and other advantages, will become readily apparent to one of skill in the art after reviewing the following disclosure.

BRIEF DESCRIPTION OF THE INVENTION

To provide the above advantages and to provide the homeowner a weatherproof, inexpensive, easily accessible mounting system, the applicant has devised a low profile support for outdoor light fixtures. The support includes a post, the top of which may be used for mounting devices that are typically exposed in an outdoors setting, such as lights, cameras, photocells to control lighting, and other similar devices. The post provides a weatherproof enclosure for housing the wiring terminations and connections.

The post in a preferred embodiment includes an elongated body of square cross section having a top and a bottom end. The top end includes an aperture to which various fixtures may be secured. The bottom end of the hollow post is tapered at an angle to provide a long opening for acceptance of electrical cables. The outlet box is accessible from one side of the post by a service portal. The service portal is provided with a removable cover that is secured thereto. The elongated post includes integral stabilizer bars located near the bottom end at or just above the long opening. The stabilizer bars stabilize and anchor the body in the ground when it is buried therein. Integral ribs are provided along the top of each stabilizer bar to stiffen and strengthen them. Apertures in the stabilizer bars are provided to accept rebar or other similar bracing material to further anchor the post if desired.

REFERENCE NUMERALS USED IN THE SPECIFICATION AND DRAWINGS

20—low profile support
22—elongated body
24—side walls
26—top end of body
28—bottom end of body
30—top wall
32—bottom opening
34—stabilizer bars
36—aperture in stabilizer bar
38—base of stabilizer bar
40—distal end of stabilizer bar
42—fin portion
44—stiffening rib
46—top edge of stabilizer bar
48—thick wall portion
50—periphery at base of stabilizer bar
52—fillet
56—aperture in top wall
58—access portal
60—electrical cable
62—ground
64—electrically conductive bushing
66—light fixture
68—cable wiring leads
69—electrically conductive nut
70—fixture wiring
71—grounding lug
72—rebar
73—ground wire
74—bottom edge of stabilizer bar
75—boss
76—fastener
78—gasket
80—cover

DETAILED DESCRIPTION

Figure 1:
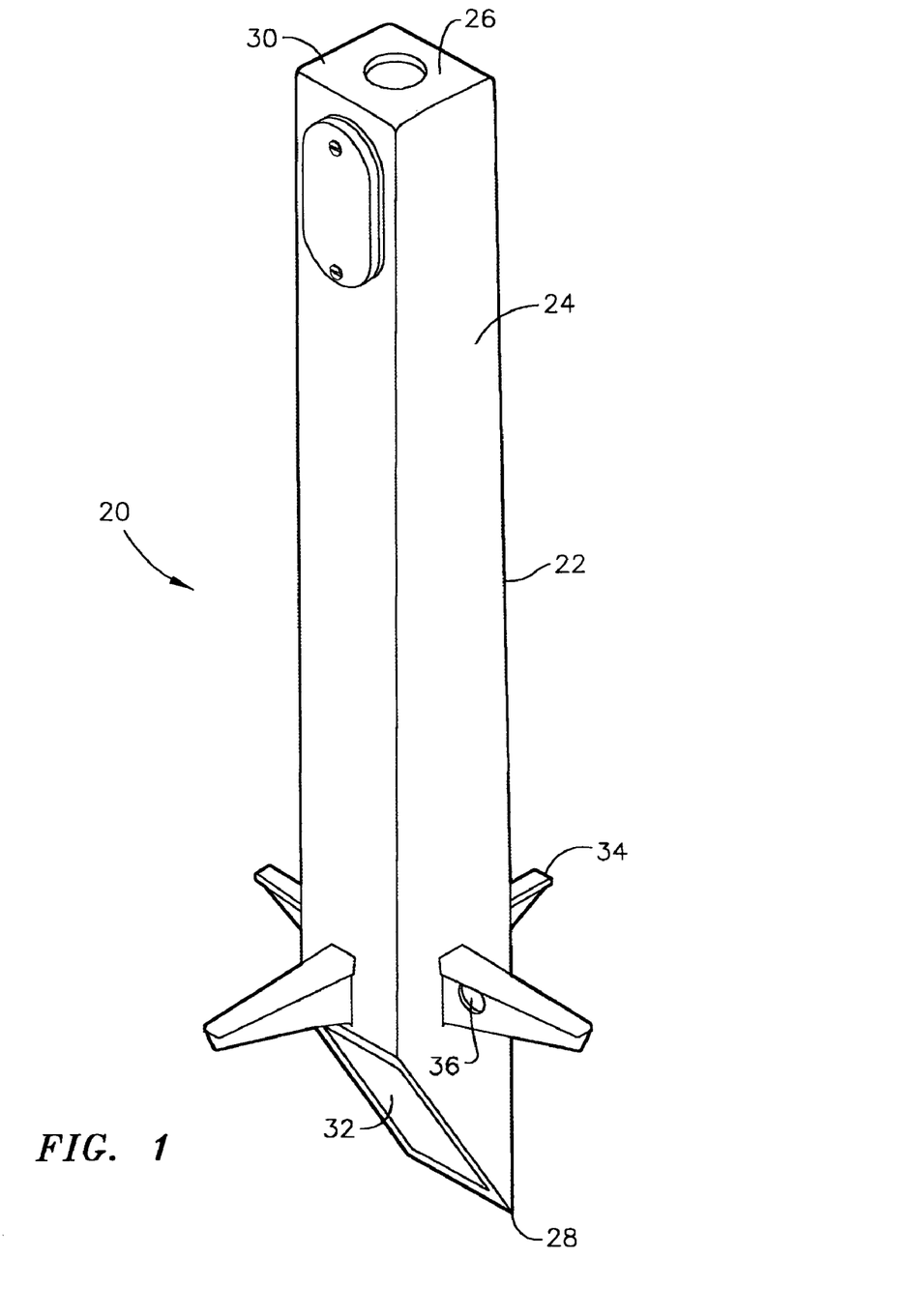
FIG. 1 is a perspective view of a preferred embodiment of the low profile support of the present invention.

Referring to FIG. 1, a preferred embodiment of the present invention, a low profile support 20 for an outdoor electrical fixture includes a rigid, square, hollow elongated body 22 that is molded of plastic in one piece. The hollow elongated body 22 includes side walls 24, a top end 26, a bottom end 28, and a top wall 30 closing the top end 26. The bottom end 28 of the elongated body 22 is cut at an angle as shown to provide a wide and long bottom opening 32 for the receipt of electrical supply cable. Integral stabilizer bars 34 extend from one or more of the side walls 24 and are located at or just above the bottom opening 32. Apertures 36 may be provided in at least one of the stabilizer bars 34 as shown.

Figure 2:
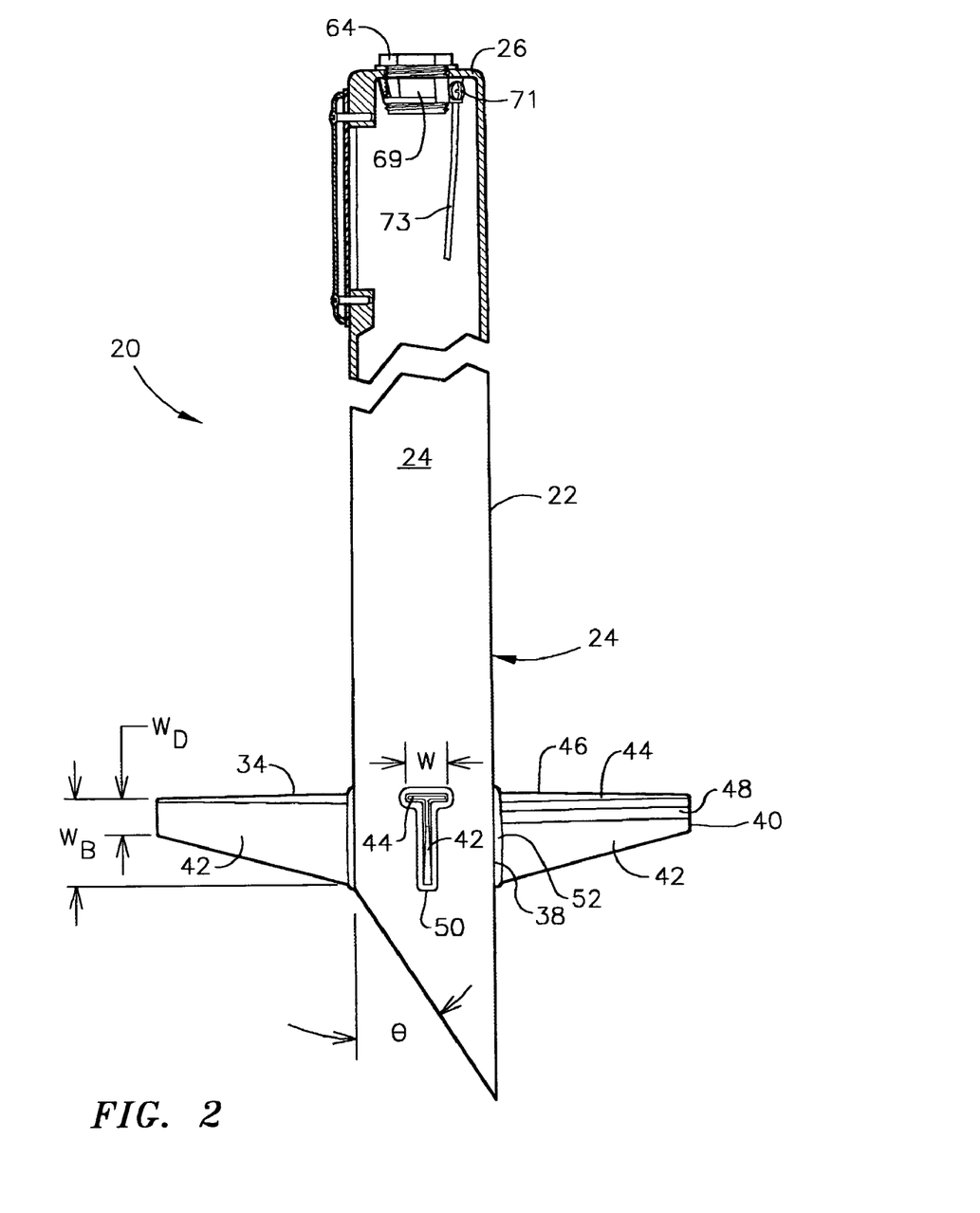
FIG. 2 is a side view of the low profile support of FIG. 1 with part of the top wall removed.

As shown in FIG. 2, each stabilizer bar 34 includes a base 38 at its juncture with the side wall 24 and a distal end 40. The stabilizer bars 34 include a fin portion 42, which is aligned longitudinally along the elongated body 22 as shown. The stabilizer bars 34 are wide at their base 38 and are tapered in width from the base to their distal ends 40. As depicted in FIG. 2, the stabilizer bars 34 are of a length as long or longer than the exterior width of the elongated body 22. Each stabilizer bar 34 includes a stiffening rib 44 along its top edge 46. The stiffening ribs 44 are aligned laterally along the body 22 of the low profile support 20 or at a 90° angle to the fin portion 42 of the stabilizer bar 34. The width of each stiffening rib, denoted by "W" in FIG. 2, is substantially wider than the width of the fin portion 42, denoted by "$W_B$". The stabilizer bars 34 may, if preferred, include thick wall portions 48 within the fin portions 42 to further stiffen them. The bottom end 28 is typically cut to an angle preferably between 20° and 40° as denoted by the angle θ in FIG. 2. An especially preferred angle for θ is 30°. The base 38 of each stabilizer bar 34 includes a periphery 50 extending around the fin portion 42 and the stiffening rib 44 portion as shown. Fillets 52 are formed substantially around the periphery 50 of the base 38 during the molding of the unitary body 22 to further stiffen the stabilizer bars 34.

Figure 3:
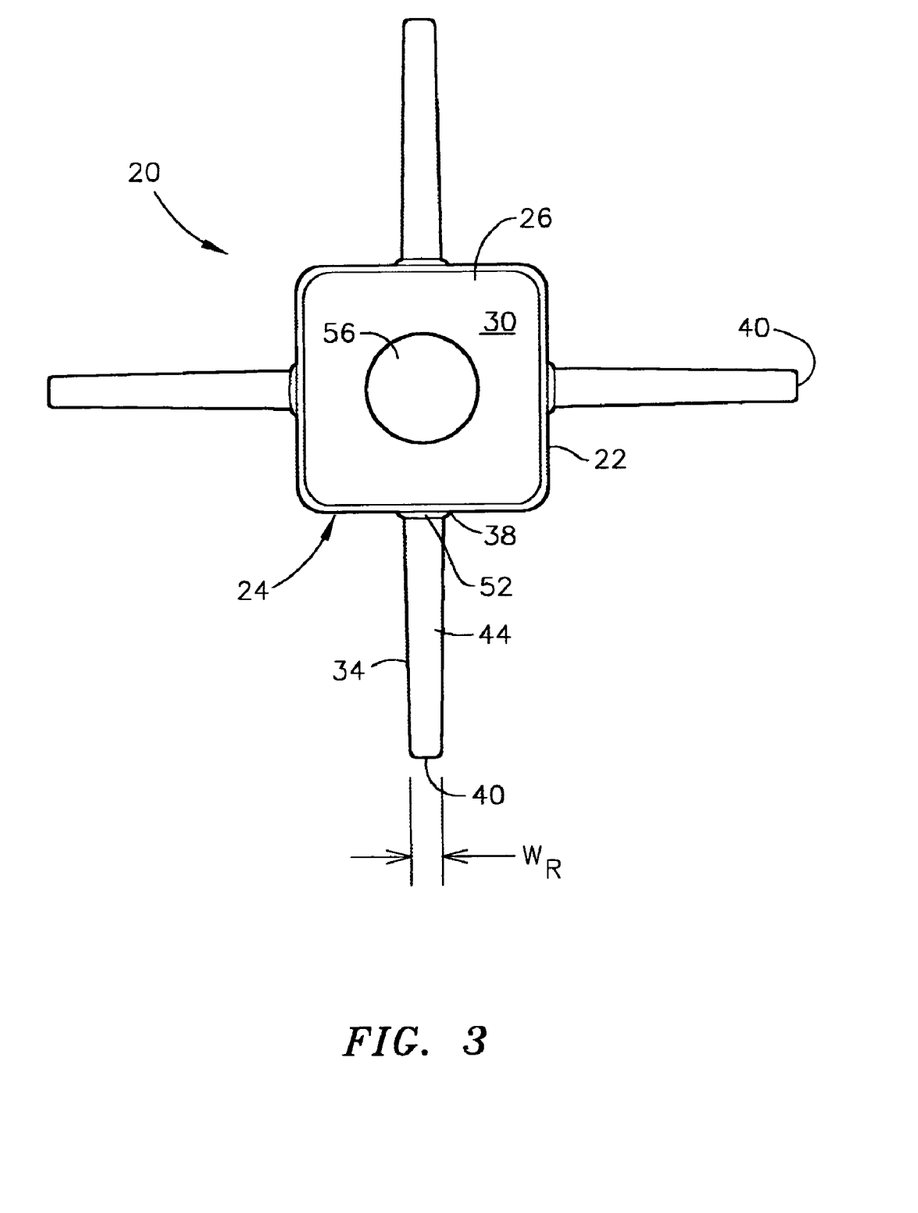
FIG. 3 is a top view of the low profile support of FIG. 1.

Referring now to FIG. 3, this top view shows the stiffening ribs 44 integral with and extending from the side walls 24 of the elongated body 22. The fillets 52 are formed substantially around the periphery of the base 38 as shown. The top end 26 is closed to form the top wall 30. An aperture 56 is provided in the top wall 30 and is typically threaded interiorly to ½"-NPT threads to accept the mounting nipple on most standard electrical fixtures (not shown). Alternatively, the aperture 56 in the top wall 30 may include an electrically conductive bushing (not shown) inserted therein and secured thereto with an electrically conductive nut (not shown).

Figure 4:
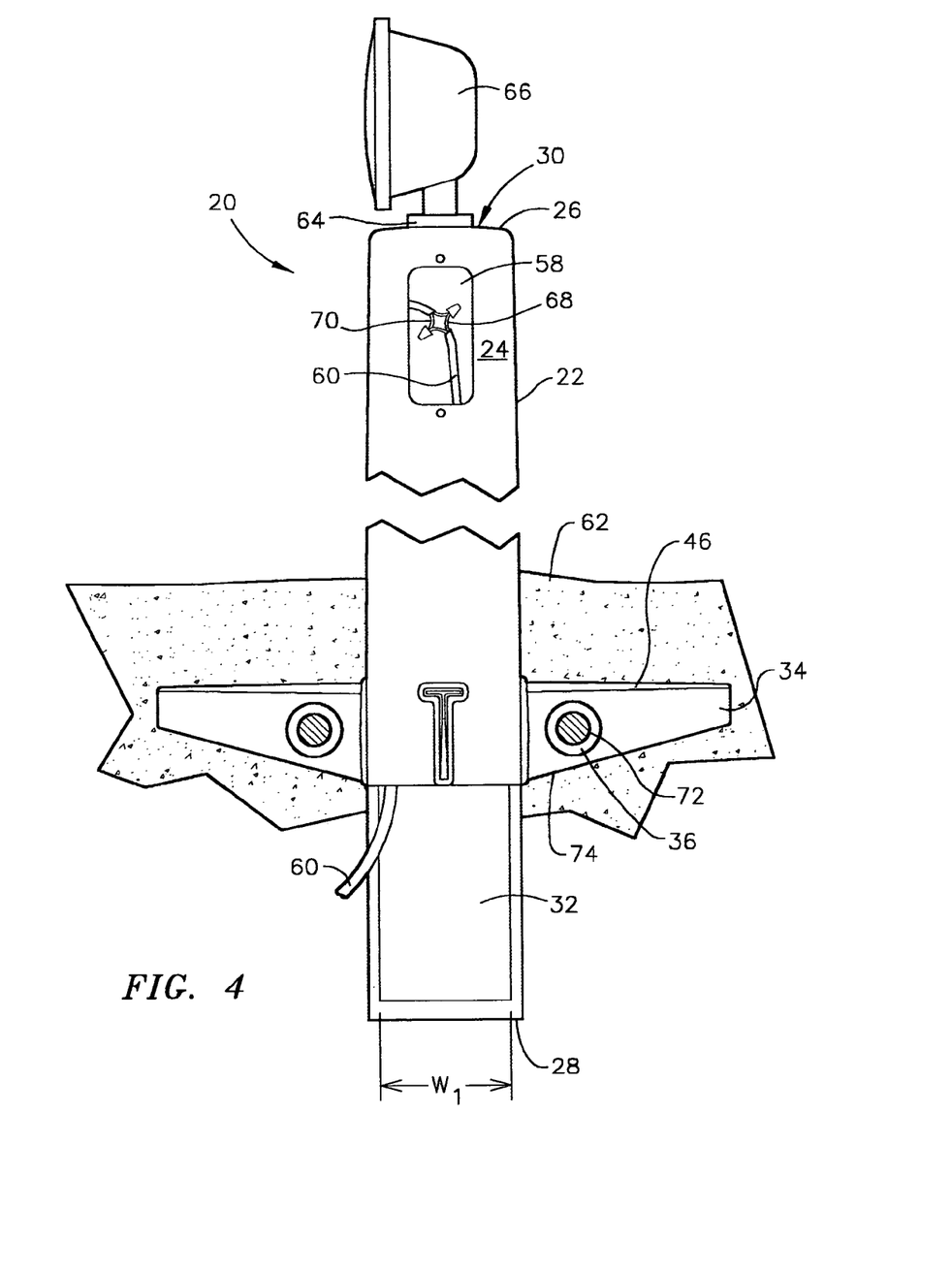
FIG. 4 is a side view of the low profile support of FIG. 1 with a portion of the wall broken away and with an outdoor light fixture mounted thereon.

A typical installation of a low profile support 20 for an outdoor light fixture according to the present invention is shown in FIG. 4. An access portal 58 is typically formed in one of the side walls 24 of the body 22 as shown. The low profile support 20 is operated by first excavating a hole in the earth in the desired location for a light or similar electrical fixture. The hole is made to a depth that will enable the integral stabilizer bars 34 to be covered with at least two inches of dirt. The bottom end 28 of the elongated body 22 is then placed into the hole with the bottom opening 32 oriented toward the direction facing the electrical supply cable 60 and the cable is run into the bottom opening 32 and fed into the hollow body 22 until a small portion extends from the access portal 58. The hole is filled with dirt, the dirt is compacted, and the resulting packed dirt around the stabilizer bars 34 and buried portion of the body 22 hold the low profile support 20 firmly in the ground 62. The embodiment of the low profile support 20 shown in FIG. 4 includes an electrically conductive bushing 64 that is threaded interiorly to ½-inch NPT. A light fixture 66 with a nipple threaded exteriorly to ½-inch NPT is then simply screwed into the electrically conductive bushing 64 on the top wall 30 of the elongated body 22. Other electrical fixtures could also be mounted to the top of the low profile support 20, including a light combined with a photocell, a light combined with a switch, a motion detector, or a motion detector combined with a light (none shown). After the light fixture 66 is installed, electrical connections are made between the cable wiring leads 68 and the fixture wiring 70.

Referring to FIG. 2, the electrically conductive bushing 64 is held by a complimentary electrically conductive nut 69 and can also include a grounding lug 71 and a ground wire 73 for grounding an attached electrical fixture (not shown).

As depicted in FIG. 3, the shape of the low profile support is preferably square. The exterior width of the square body 22 is preferably 2.0 to 3.0 inches. An especially preferred size for the exterior width of the body 22 is 2.25 inches.

With Reference to FIG. 4, by providing a sharply angled bottom 28, a wide bottom opening 32 is created for the entry of cable 60 therein. The bottom opening 32 is preferably between 2.0 and 2.4 inches wide (dimension $W_1$) and between 4.0 and 5.0 inches long (dimension L1) and more preferably 2.2 inches wide by 4.5 inches long.

Typically, packing the ground 62 around the lower portion of the low profile support 20 and the stabilizer bars 34 is quite sufficient to anchor the support 20 securely in the ground. However, if additional anchoring is required, such as in sandy soils that do not compact well, rebar 72 or similar anchoring material may be inserted through the large apertures 36 in the stabilizer bars 34. The apertures 36 in the stabilizer bars 34 preferably extend from near the bottom edge 74 to the top edge 46 of the bar 34 and are preferably from 0.4 to 0.70 inch in diameter, or more preferably about 0.63 inch in diameter. If buried in the ground without additional anchors through the stabilizer apertures 36, the large apertures typically enable a passageway for plant roots to grow there through and further anchor the support in the ground.

Figure 5:
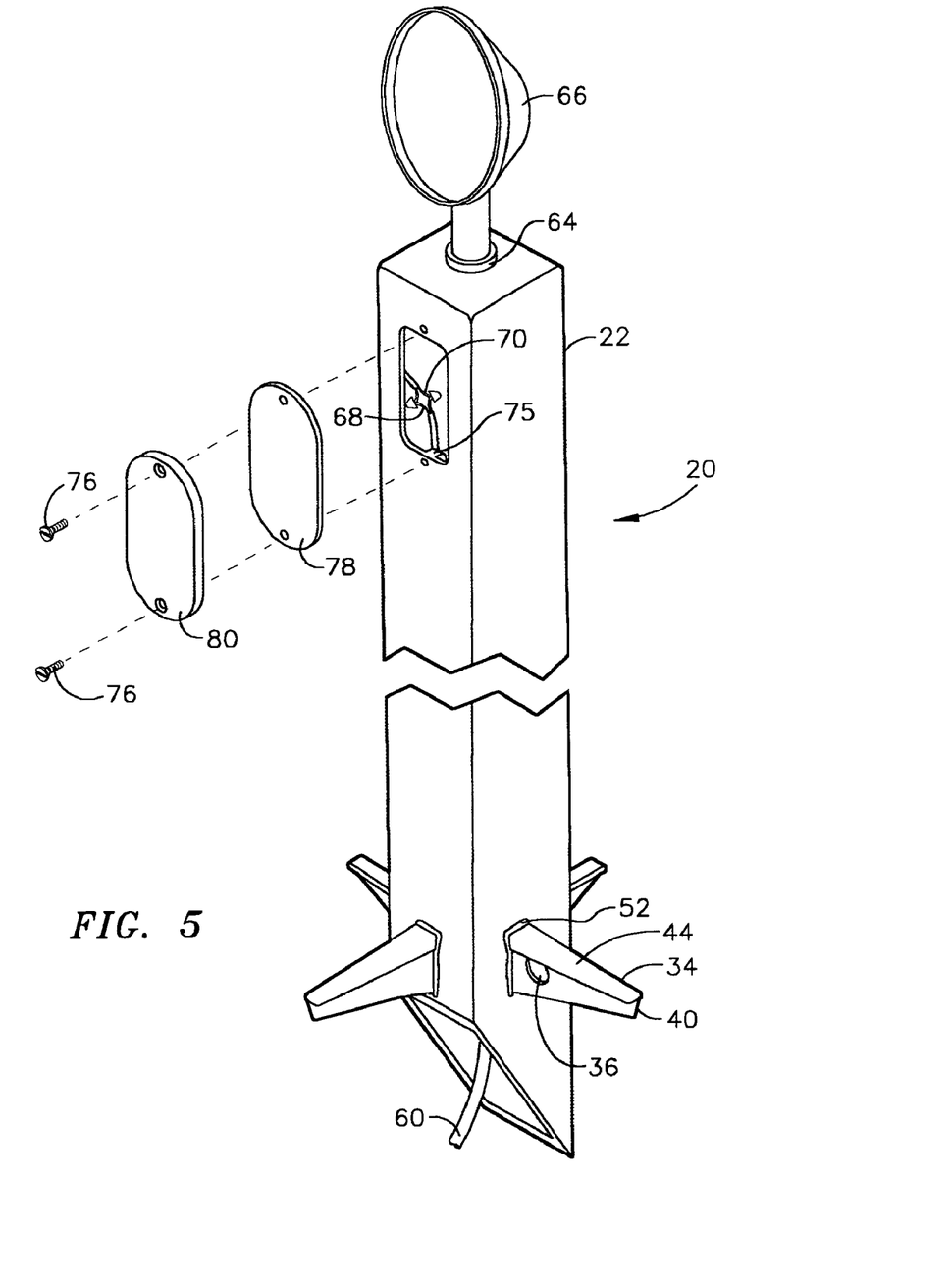
FIG. 5 is a plan view of the low profile support of FIG. 1 with a light fixture, cover, and gasket exploded away from the support.

After being buried and secured to the ground (not shown), the assembly of the low profile support 20 can be completed as shown in FIG. 5. The elongated body 22 typically is provided with bosses 75 to accept fasteners 76 for attaching a gasket 78 and a cover 80 to seal the access portal 58 and thereby waterproof the interior of the low profile support 20.

Figure 6:
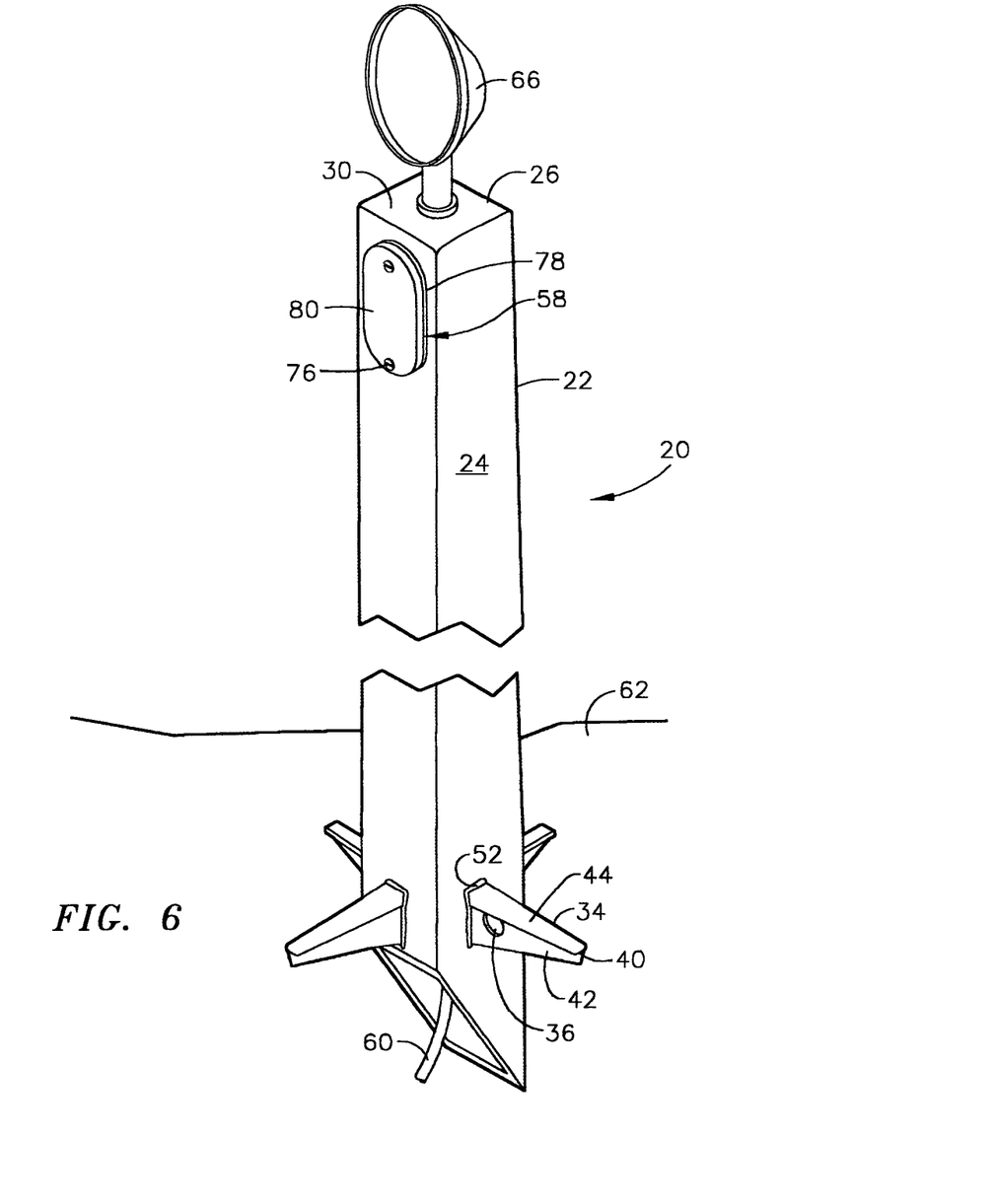
FIG. 6 is a perspective view of the low profile support of FIG. 1 with a light fixture, cover, and gasket mounted thereon.
Figure 7:
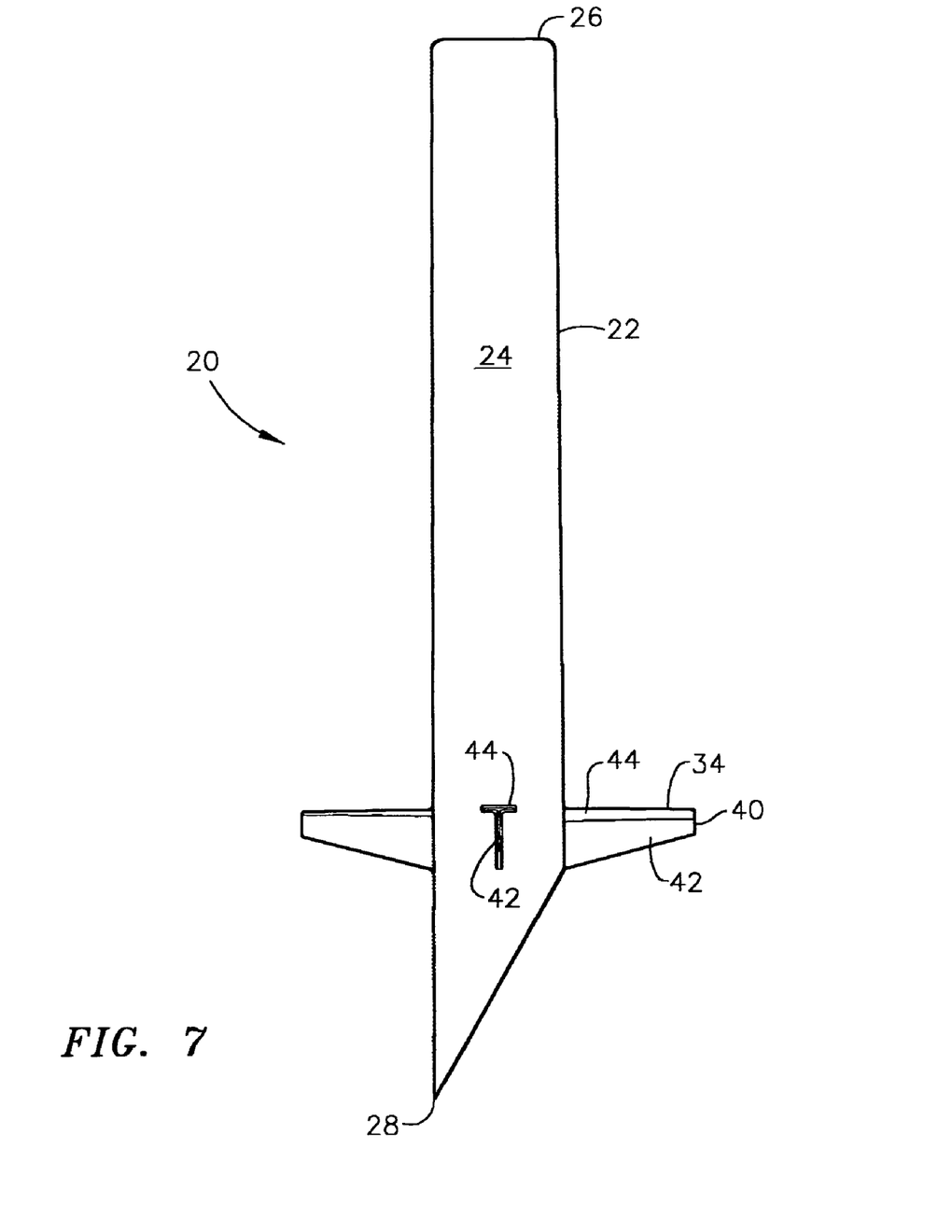
FIG. 7 is a side view of the low profile support of FIG. 1.
Figure 8:
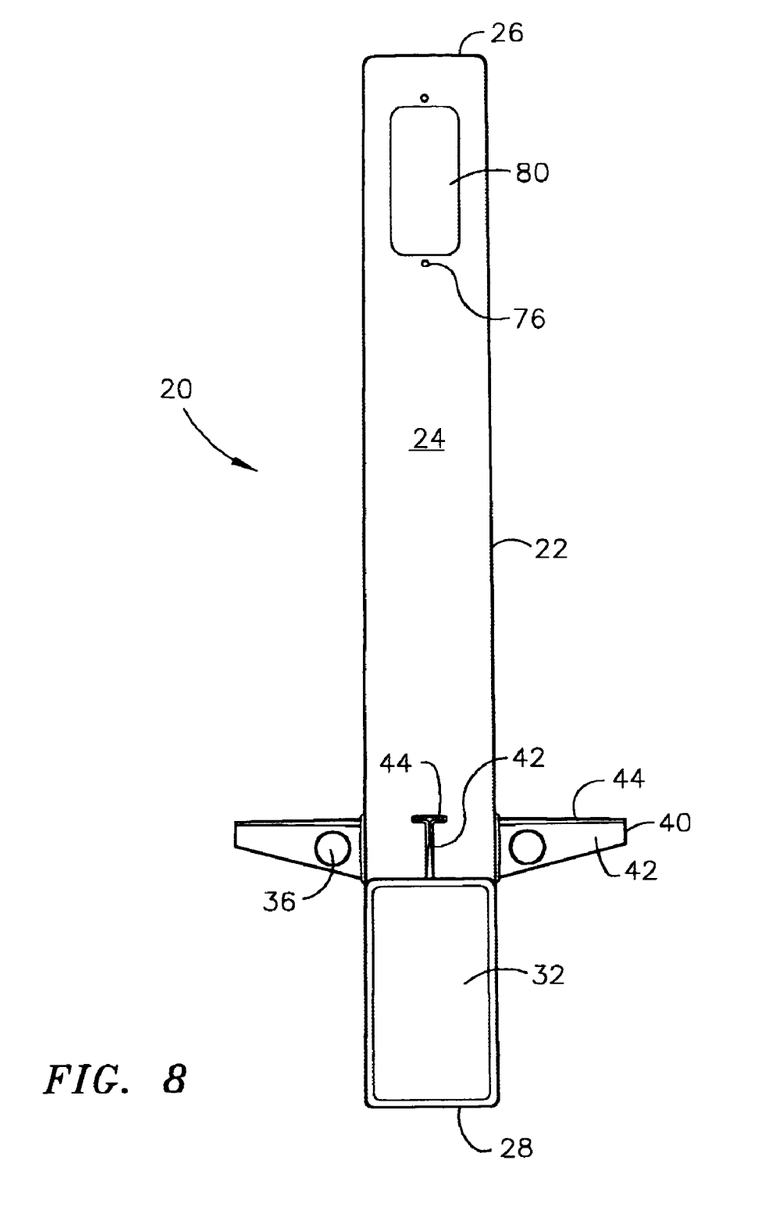
FIG. 8 is a front view of the low profile support of FIG. 1
Figures 9, 10:
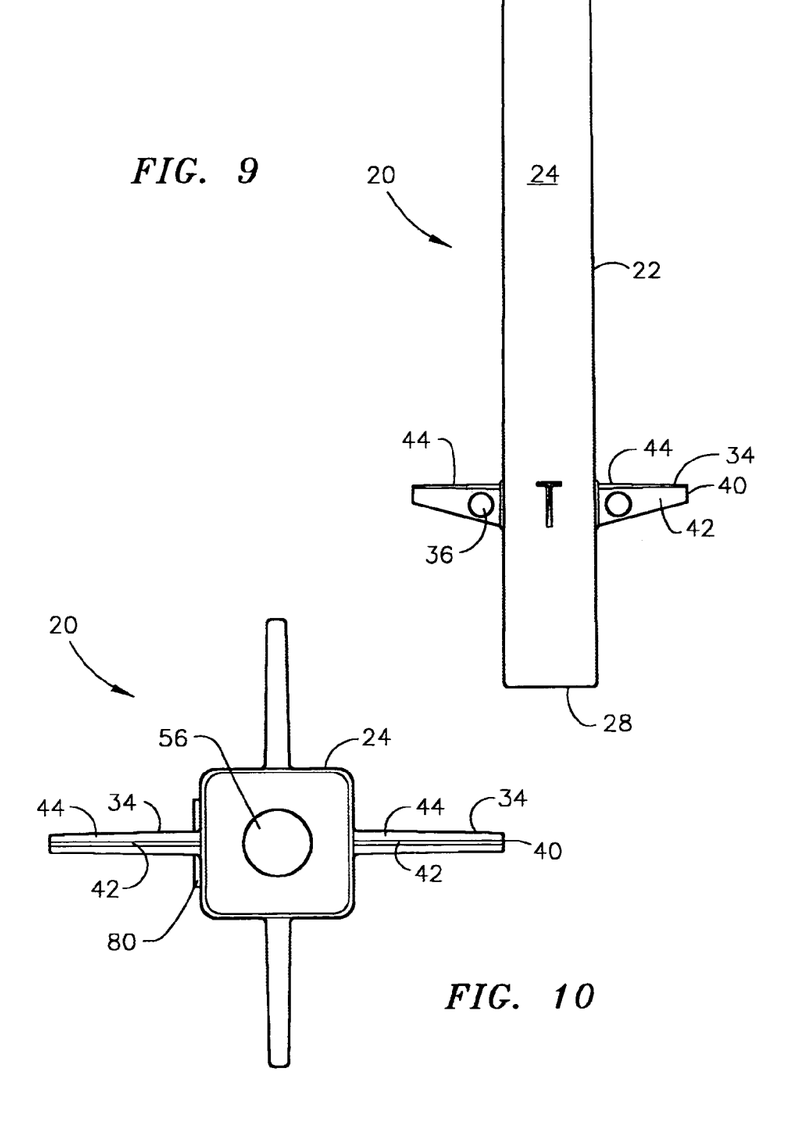
FIG. 9 is a rear view of the low profile support of FIG. 1.
FIG. 10 is a bottom view of the low profile support of FIG. 1.

FIG. 6 depicts the completed installation of a low profile support 20 according to the present invention. The low profile support is secured in the ground 62 by the earth packed around the lower portion of the body 22 and the integral stabilizer bars 34. The wiring and connections (not shown) are protected within the interior of the support 20 by the cover 80 and compressed gasket 78 sealed around the access portal 58. The overall length of the elongated body 22 is preferably between 10 and 25 inches and, more preferably, 19.6 inches in length. The length between the base 38 and distal end 40 of the stabilizer bars is approximately the width of the exterior of the body 22 or preferably between 2.0 and 3.0 inches and, more preferably, 2.25 inches.

Referring to FIG. 2, the stabilizer bars 34 are preferably between 1.0 and 1.25 inches in width ($W_B$ in FIG. 2) at the base 38 and between 0.46 and 0.54 inches in width ($W_D$ in FIG. 2) at the distal end 40. More preferably, the stabilizer bars 34 are 1.125 inches in width at the base and 0.50 inch in width at the distal end 40.

Referring to FIG. 6, the body 22 of the low profile support 20 is typically rigid and formed in an injection molding process in one piece and with a sufficient wall thickness to support the fixture and make it sturdy enough to resist lawn mowers or similar equipment when mounted in the ground. A presently preferred material for forming the body is plastic such as polyvinyl chloride, polycarbonate, or polyethylene. The elongated body 22 of the low profile support 20 is molded of plastic with a wall thickness of preferably between 0.100 and 0.150 inch thick or, more preferably, 0.125 inch thick. The cover 80 is also typically molded of the same plastic and in the same color as the body 22. Both the body and cover can be matched in color by adding pigments or other colorants to the molten plastic. By providing a unitary body 22 and a cover 80 produced by an injection molding process, the elongated body does not exhibit discoloration from chipping. Therefore, the body and cover have the advantage of not showing chips and dents from accidental bumps by lawn mowers, yard tools, and the like.

Referring to FIG. 3, the stiffening ribs 44 are preferably between 0.4 and 1.0 inch wide ($W_R$) at the distal end 40 of the stabilizer bars, and, more preferably 0.6 inch wide.

To enhance understanding of the present invention, additional views of the completed low profile support 20 are provided in FIGS. 7–10.

The low profile support is designed and constructed to accept line voltage, or 120 volt power, and fixtures requiring line voltage. However, it also may easily be used for low-voltage fixtures if preferred.

Suitable gasket materials may be any of the commonly available flexible waterproof materials, such as rubber (natural or synthetic), Neoprene™, Santoprene™, or other flexible resilient deformable plastic materials.

While the invention has been described by reference to the preferred embodiment disclosed herein, the invention is subject to considerable modification and may be tailored to fit the needs of many suitable mounting needs without departing from the scope or spirit of the claims which are appended hereto.

What is claimed is:

1. A low profile support for mounting an electrical fixture in the ground comprising:
    a rigid, square, hollow elongated body having side walls, a top end, and a bottom end;
    a top wall integral with said side walls and closing said top end;
    an aperture in said top wall;

said bottom end cut at an angle to provide a substantially wide and long bottom opening therein for the receipt of cables;

an access portal formed in a first of said side walls;

a plurality of integral stabilizer bars extending from one or more of said side walls at or just above said bottom opening, said integral stabilizer bars including a fin portion and a base at the juncture with said side walls and a distal end;

said fin portion tapered from said base to said distal ends;

said integral stabilizer bars having a length between said base and said distal end of approximately the exterior width of said rigid body;

said integral stabilizer bars including integral stiffening ribs along their top edges;

said ribs substantially wider than said fin portion;

said base including a periphery extending around said stabilizer bar and said rib;

integral fillets formed substantially around said periphery of said base;

one or more openings in at least one of said integral stabilizer bars in said fin portion between said base and said distal end; and a removable cover secured across said access portal.

2. The low profile support of claim 1 wherein said rigid body is molded in one piece of a suitable plastic.

3. The low profile support of claim 2 wherein said plastic is polyvinyl chloride or polycarbonate.

4. The low profile support of claim 1 wherein the walls of said aperture in said top wall includes threads.

5. The low profile support of claim 4 wherein said threads are ½" NPT.

6. The low profile support of claim 1 wherein the outer wall of said closed top includes an electrically conductive bushing inserted in said aperture and secured thereto with an electrically conductive nut.

7. The low profile support of claim 6 wherein said nut includes a grounding lug secured thereto.

8. The low profile support of claim 7 wherein said bushing is internally threaded to ½" NPT threads.

9. The low profile support of claim 1 wherein said elongated body is preferably between 10 and 25 inches in length.

10. The low profile support of claim 9 wherein said exterior width of said rigid body is preferably 2.0 to 3.0 inches.

11. The low profile support of claim 1 wherein said length between said base and said distal end of said stabilizer bar is preferably 2.0 to 3.0 inches.

12. The low profile support of claim 1 wherein said angle of said bottom end is preferably between 20 and 40 degrees with respect to said side walls.

13. The low profile support of claim 1 wherein said stabilizer bars are preferably between 1.0 and 1.25 inches in width at said base and between 0.46 and 0.54 inches in width at said distal end.

14. The low profile support of claim 1 wherein said ribs are preferably between 0.40 and 1.0 inch wide.

15. The low profile support of claim 1 further comprising a plurality of integral bosses including one at the upper end of said access portal and one at the lower end of said access portal with each of said bosses including one or more apertures for securing thereto said cover.

16. The low profile support of claim 1 wherein said bottom opening is preferably between 2.0 and 2.4 inches wide and between 4.0 and 5.0 inches long.

17. The low profile support of claim 1 wherein said side walls are preferably between 0.100 to 0.150 inch thick.

* * * * *